April 5, 1960          C W. MUSSER          2,931,248
STRAIN WAVE GEARING – STRAIN INDUCER SPECIES
Filed March 23, 1959          9 Sheets-Sheet 1
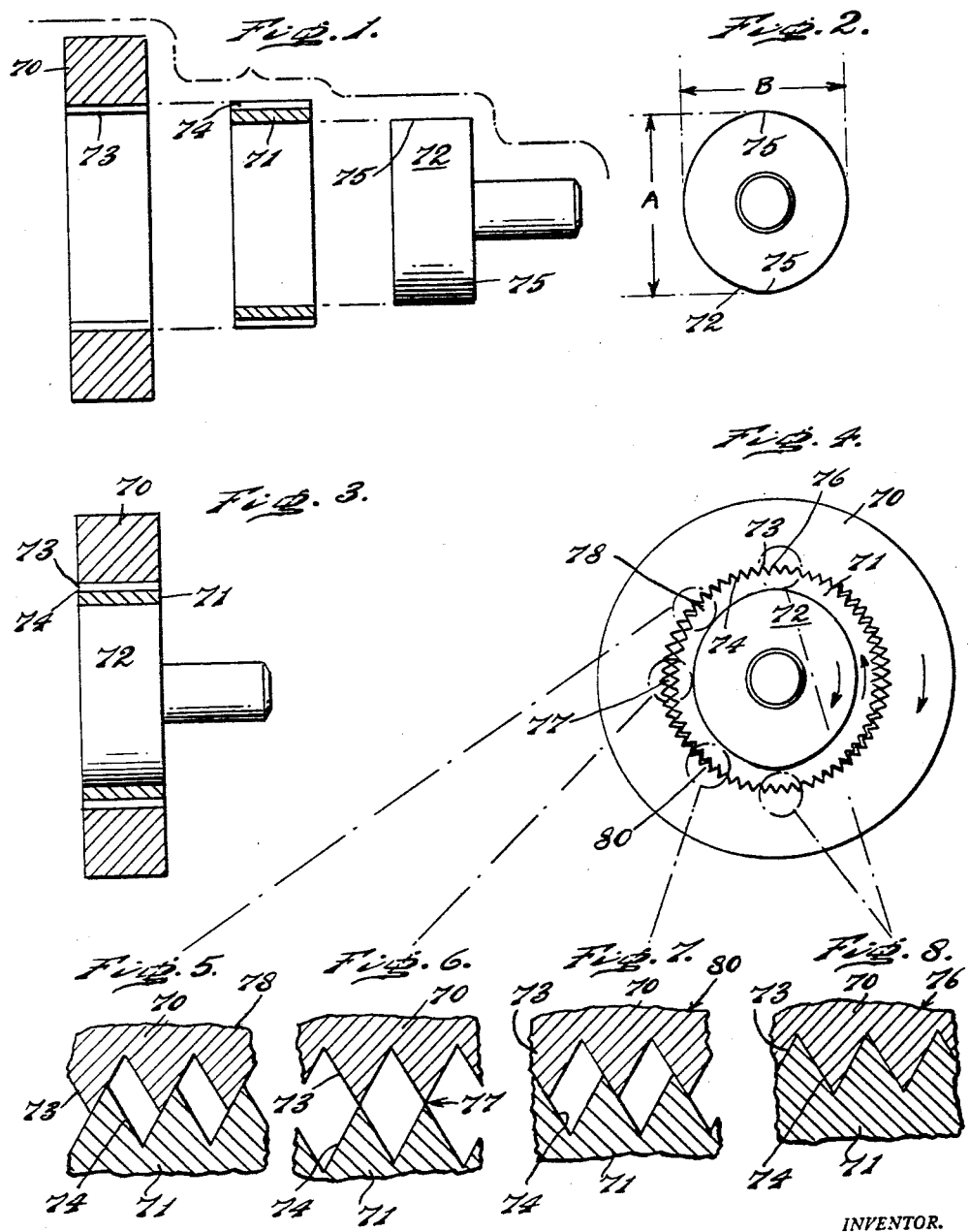
INVENTOR.
C. Walton Musser
BY
ATTORNEYS.

April 5, 1960 C W. MUSSER 2,931,248
STRAIN WAVE GEARING - STRAIN INDUCER SPECIES
Filed March 23, 1959 9 Sheets-Sheet 2

Gear ratio
2 in 200
100 to 1

Gear ratio
2 in 198
99 to 1

INVENTOR.
C. Walton Musser

BY
ATTORNEYS.

April 5, 1960 — C W. MUSSER — 2,931,248
STRAIN WAVE GEARING - STRAIN INDUCER SPECIES
Filed March 23, 1959 — 9 Sheets-Sheet 3

INVENTOR
C. Walton Musser
BY
ATTORNEYS.

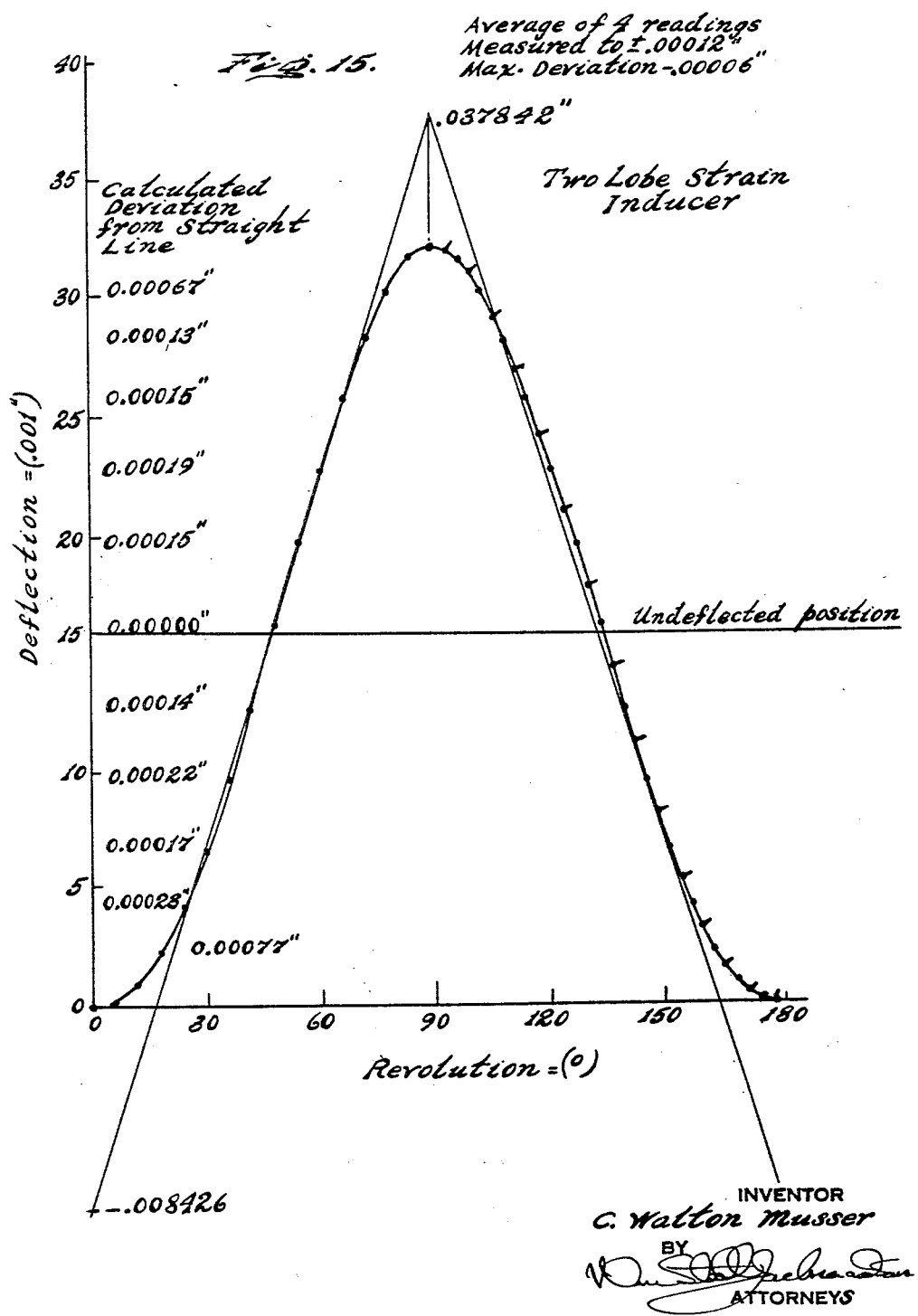

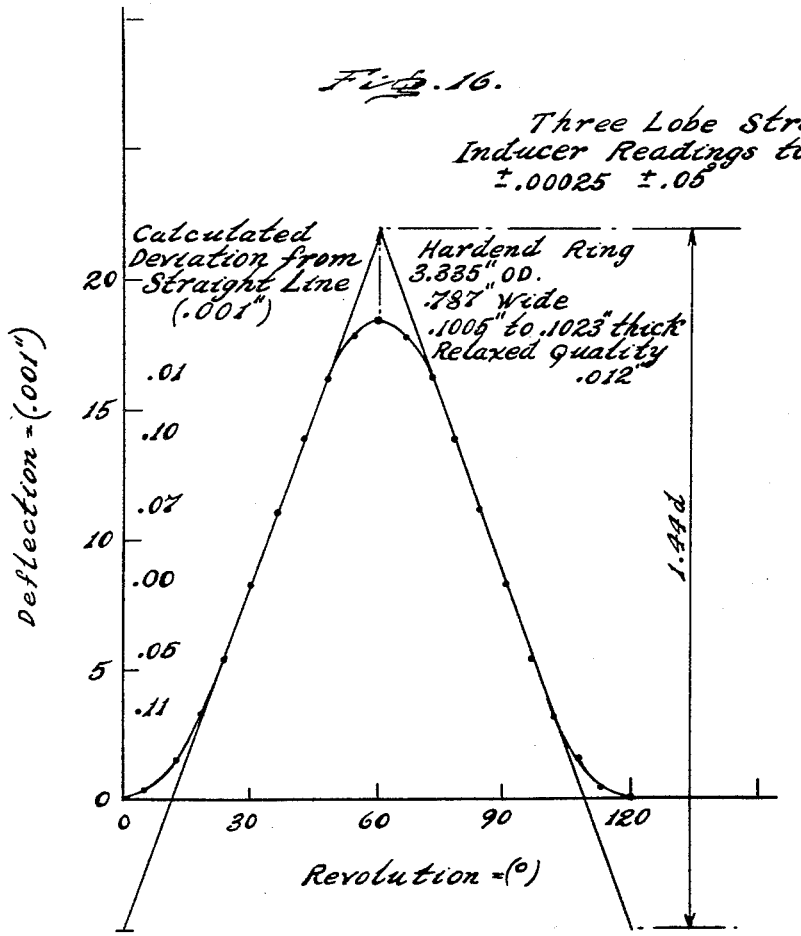

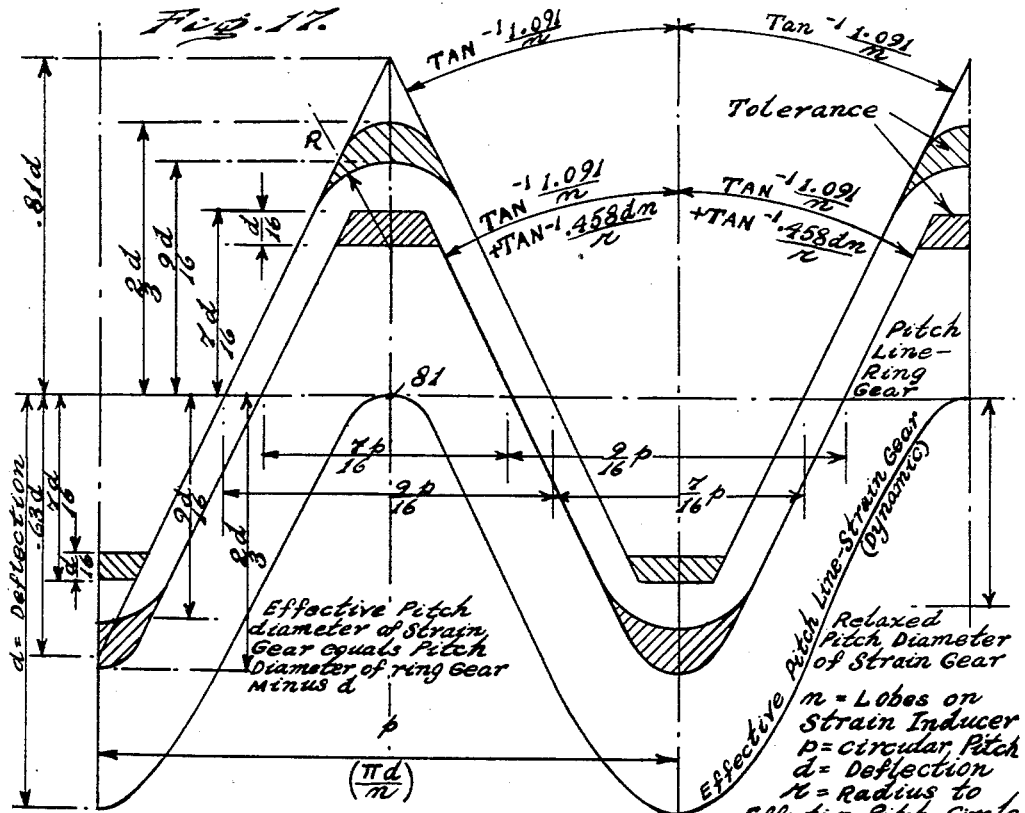
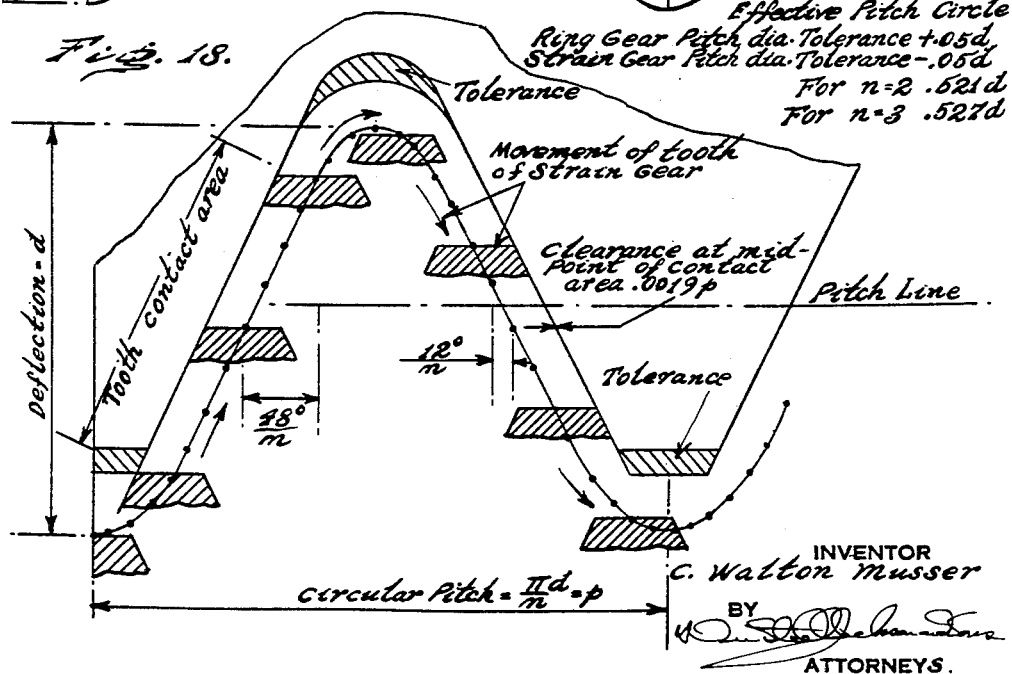

April 5, 1960 C W. MUSSER 2,931,248
STRAIN WAVE GEARING – STRAIN INDUCER SPECIES
Filed March 23, 1959 9 Sheets-Sheet 7

INVENTOR
C. Walton Musser
ATTORNEYS.

April 5, 1960 C W. MUSSER 2,931,248
STRAIN WAVE GEARING – STRAIN INDUCER SPECIES
Filed March 23, 1959 9 Sheets-Sheet 8
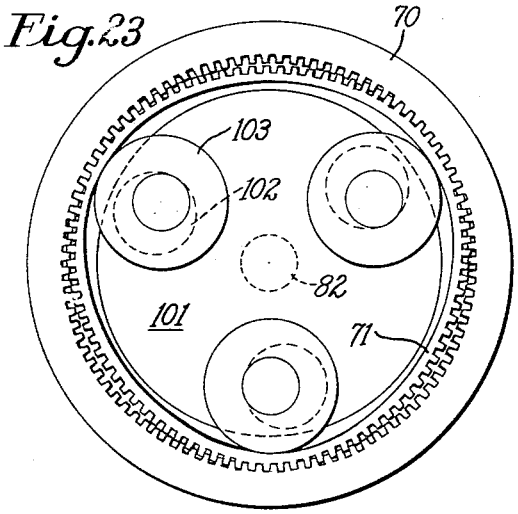
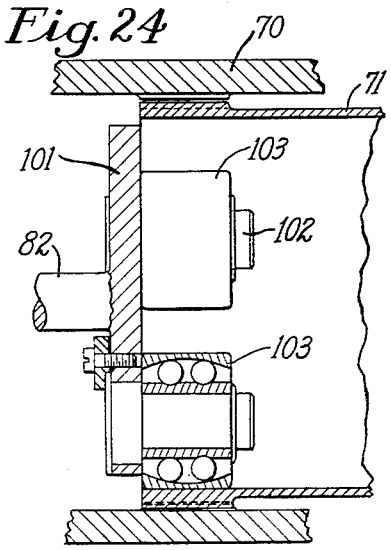
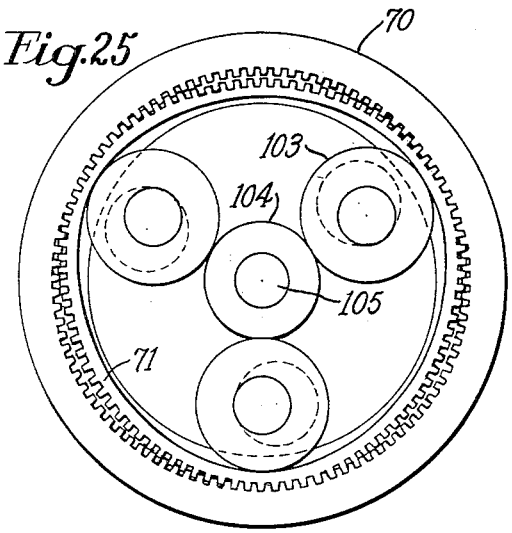
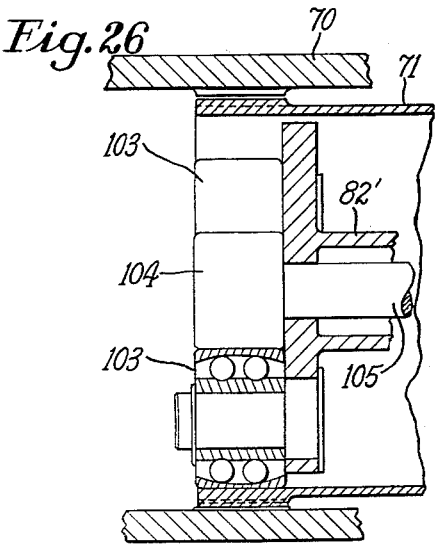

United States Patent Office 2,931,248
Patented Apr. 5, 1960

2,931,248

STRAIN WAVE GEARING—STRAIN INDUCER SPECIES

C Walton Musser, Beverly, Mass., assignor to United Shoe Machinery Corporation, Flemington, N.J., a corporation of New Jersey Application March 23, 1959, Serial No. 801,191

13 Claims. (Cl. 74—640)

The present invention relates to motion transmitting mechanism, and particularly to gearing in which relative motion occurs between an internal gear and a cooperating external gear.

The present application relates to a species not elected in my application Serial No. 495,479, filed March 21, 1955, for Strain Wave Gearing, now United States Patent No. 2,906,143, granted September 29, 1959, and the present application is a continuation-in-part of my said parent application. The reader is referred to my patent aforesaid for detailed information as to the principles of the invention.

The species of the parent application relating to the dual form and to the electromagnetic strain-inducer is embodied in my copending application Serial No. 656,572, filed May 2, 1957, for Dual Strain Wave Gearing.

A purpose of the invention is to secure relative motion between cooperating internal and external gears, by propagating a strain wave which advances an area of contact or preferably a plurality of areas of contact between the respective gears.

A further purpose is to obtain a large angle of action in gearing.

A further purpose is to move bearing elements radially inwardly and outwardly under adjustable control to produce the strain wave.

A further purpose is to accomplish eccentric adjustment of bearing elements.

A further purpose is to employ three lobes on the strain inducer.

Further purposes appear in the specification and in the claims.

In the drawings I have chosen to illustrate a few only of the numerous embodiments in which my invention may appear, selecting the forms shown from the standpoints of convenience in illustration, satisfactory operation, and clear demonstration of the principles involved.

Figure 1 is an exploded axial section of a device for transmitting motion according to the present invention, in a simplified form.

Figure 2 is a right end elevation of the strain inducer shown in Figure 1.

Figure 3 is an axial section corresponding generally to the exploded section of Figure 1, but showing the parts assembled in their normal operating relationship.

Figure 4 is a right end elevation of the assembly of Figure 3.

Figures 5 to 8 inclusive are enlarged developed fragmentary sections transverse to the axis showing the relative relations of the teeth at various positions in Figure 4, as indicated by the corresponding section lines.

Figure 9:
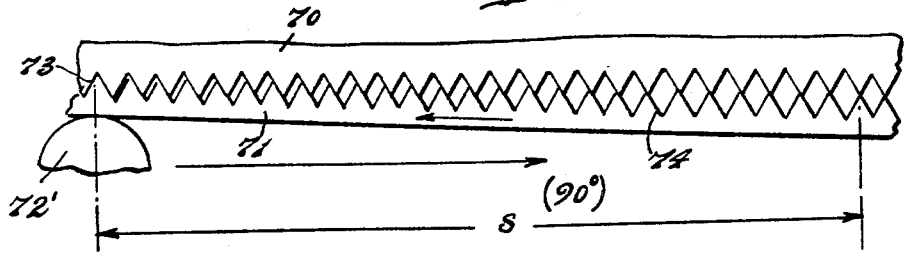
Figure 10:
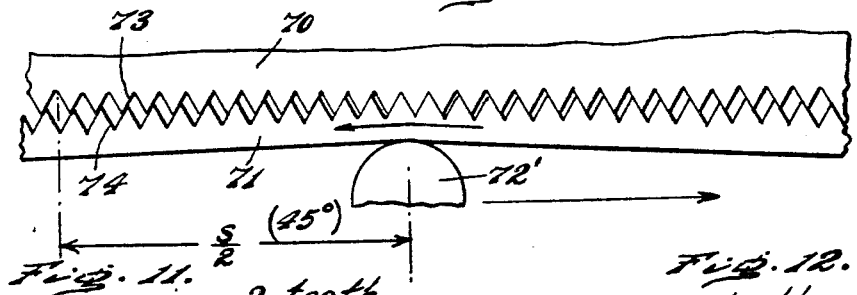

Figures 9 and 10 are enlarged developed fragmentary elevations of the relative relationships of the ring gear and strain gear at different positions of the strain inducer. These views likewise correspond with positions of rack elements which may be employed according to the invention.

Figure 11:
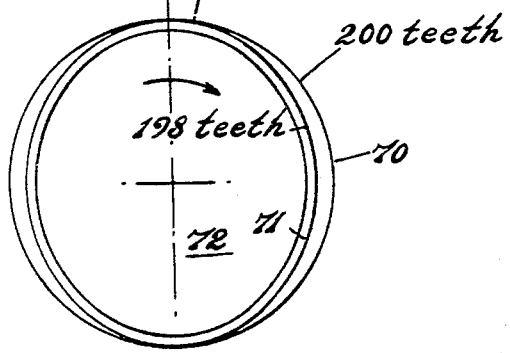

Figure 11 is a diagrammatic end elevation showing the mating position where the ring gear is driven and the strain gear is stationary.

Figure 12:
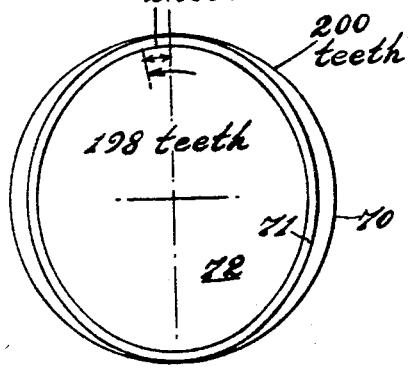

Figure 12 is a view corresponding to Figure 11, but drawn for the condition in which the ring gear is stationary and the strain gear is driven.

Figure 13:
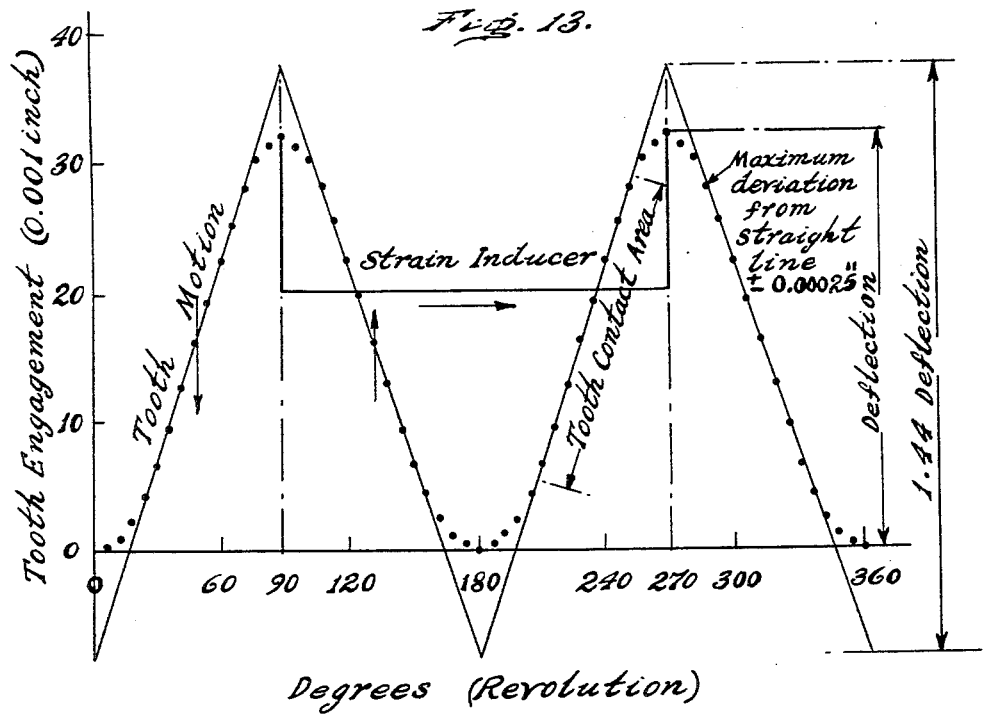

Figure 13 is a diagram showing strain wave as ordinate with respect to a developed deflection circle as the abscissa.

Figures 14A, 14B:
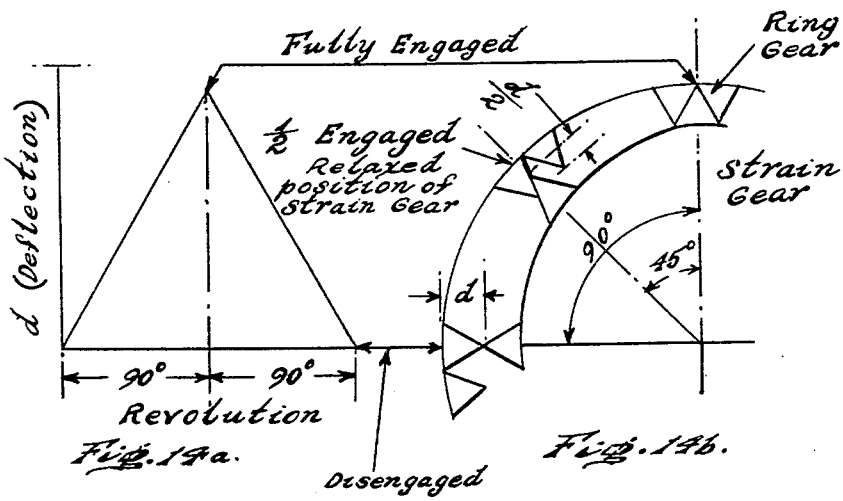

Figures 14a and 14b are diagrams which illustrate the shape of the tooth for a linear relation between deflection and revolution.

Figure 15 is a diagram plotting deflection against the advancing revolution for 180°, using a two lobe strain inducer. This illustrates particularly the linearity of deflection plotted against revolutions.

Figure 16 is a similar curve for a three lobe strain inducer, plotting deflections against revolutions over 120°. Again, the curve illustrates the linearity of the relationship.

Figure 17 is a tooth profile diagram in accordance with the invention.

Figure 18 is a similar diagram showing successive tooth positions.

Figures 19 to 30 inclusive illustrate various aspects of the mechanical strain inducer and its method of production.

Figures 19 to 22 inclusive illustrate a mechanism which may be employed in producing a suitable strain inducer contour.

Figure 19:
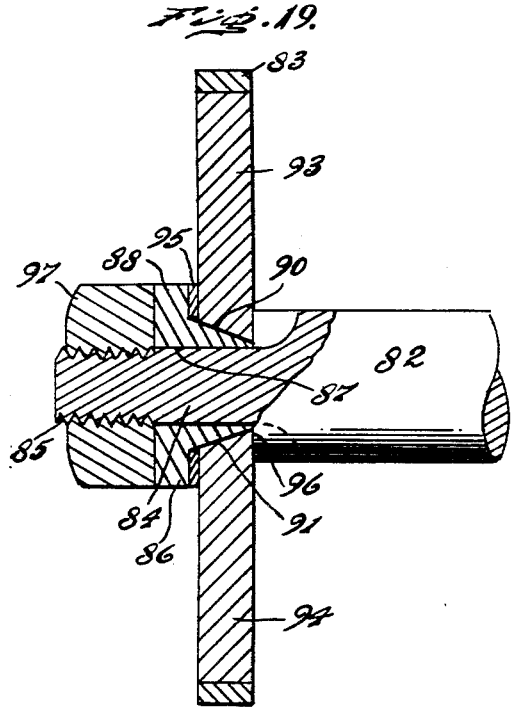

Figure 19 is an axial section showing the expansion mechanism in position to expand a ring.

Figure 20:
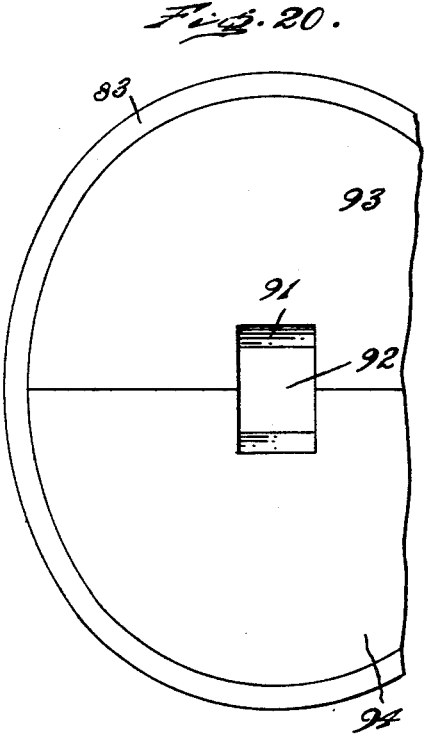

Figure 20 is a detail end elevation of the elliptical expanding segments.

Figure 21:
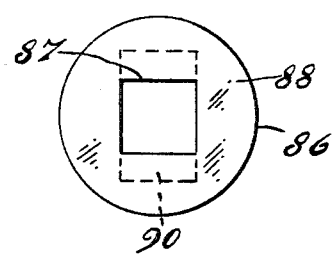

Figure 21 is a detail left end elevation of the washer shown in Figure 19.

Figure 22:
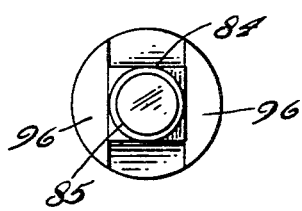

Figure 22 is an end elevation of the cam shaft of Figure 19.

Figures 23 and 24 illustrate a further variant of the mechanical strain inducer, Figure 23 being an end elevation and Figure 24 being an axial section.

Figures 25 and 26 show a still further form of mechanical strain inducer, Figure 25 being an end elevation and Figure 26 being an axial section.

Figure 27:
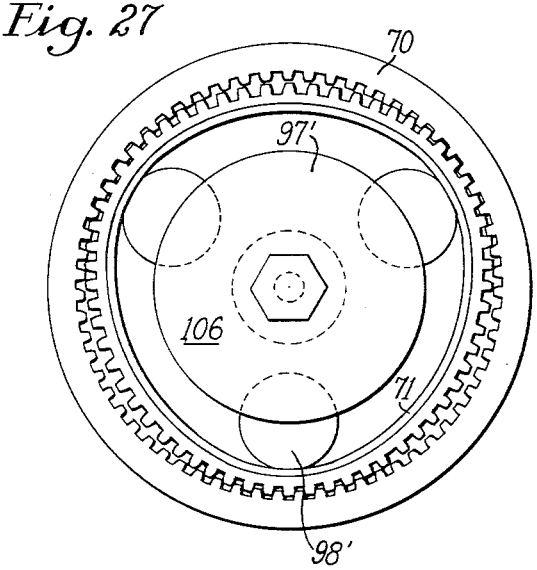
Figure 28:
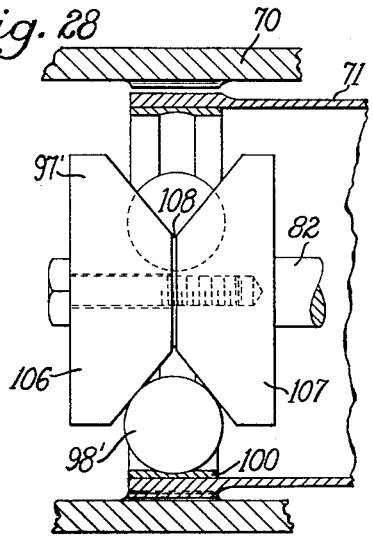

Figures 27 and 28 illustrate respectively in end elevation and axial section a still further form of strain inducer.

Figure 29:
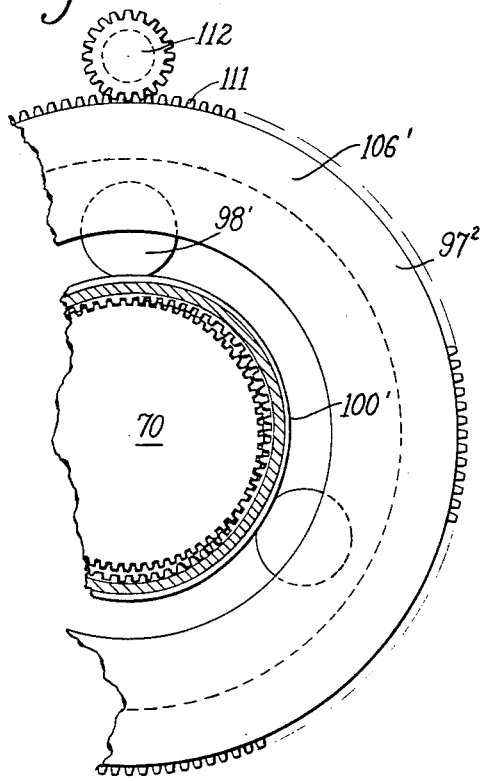

Figure 29 is a fragmentary transverse section largely in end elevation of an external strain inducer form similar to the form of Figures 27 and 28.

Figure 30:
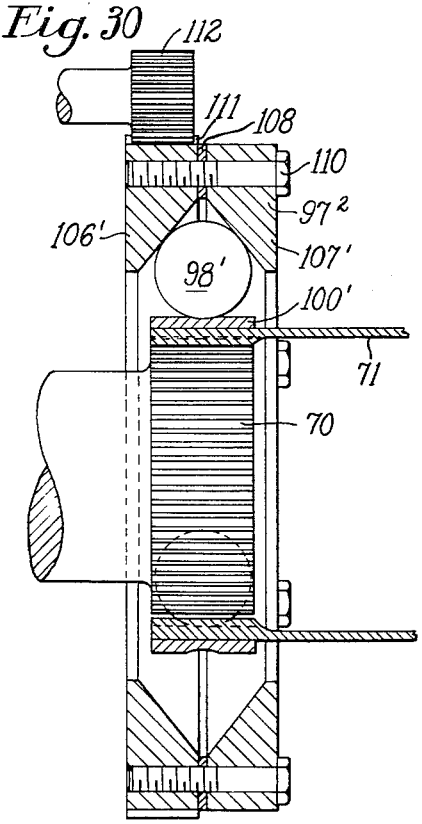

Figure 30 is a fragmentary axial section of the device of Figure 29.

Describing in illustration, but not in limitation and referring to the drawings:

GENERAL FEATURES OF INVENTION

The present invention is concerned with eliminating difficulties encountered in conventional gearing, as will be explained more in detail later. The present invention deals particularly with gearing of a character in which inner and outer concentric gears are brought into mating relationship in a plurality of spaced areas, with interspersed areas in which they are not in mating relationship, and the areas of mating relationship are propagated forward in a wave which for the purposes of the present invention is described as a strain wave, since it represents a wave deflection in one of the gearing elements.

This strain wave is actually superimposed on the circumference of one or both of the gears, and travels with respect to it at a rate which is determined by the rate of application of load or rotatory force to the mechanism.

It should be appreciated that in the mechanism of the present invention, unlike all ordinary gearing, two cooperating gears move into and out of tooth engagement by radial motion of the teeth of one gear with respect to the other, without in the least necessitating any change in the gear axis. It will be evident, therefore, that this action presupposes a motion of parts of one of the gears with respect to other parts which can be accomplished in any suitable manner, but preferably will be achieved by deflecting an elastic material, which may be for example an elastomer such as rubber, synthetic rubber, nylon, or other plastic, or a metal such as steel, bronze, or other gear material, moving within the elastic limit, and thereby substantially free from plastic deformation.

While the principles of the invention are applicable to strain elements having tooth engagement which are deflected to mate and propagate a strain wave, like cooperating rack elements, it will be evident that the invention is believed to have its widest application in relatively internal and external gears, one of which is deflected at a plurality of points and mates with the other cooperating gear.

It will, however, be understood that the principles of the invention are applicable to any suitable mechanism which applies the propagated wave inducing mating engagements according to the disclosure of the invention.

PRINCIPLES OF OPERATION

Strain wave gearing is a novel system for transmitting motion and power, in which the gear tooth engagement is induced at a plurality of points by the deflection of a thin ring gear or the like. The tooth engagement at a plurality of points around the circumference is propagated along the periphery of the thin ring gear as the crest of the induced deflection wave is made to move around this periphery. As the deflection moves around the gear, each tooth moves radially in and out of engagement as it progresses from one tooth to the next, tracing during this motion a curve which is generally of the character of a sinusoidal wave, giving rise to the term "strain wave gearing." Such a wave is illustrated in Figure 13.

In the simplest form as shown for example in Figures 1 to 10 inclusive, the motion transmitting device consists of a ring gear 70, a strain gear 71, and a strain inducer 72. The ring gear has internal teeth 73 in the illustration shown, which are preferably of axially extending character. In this form the strain gear 71 has external teeth 74 which also preferably extend axially and at the same diametral pitch as the teeth on the ring gear but have a slightly smaller pitch diameter. This difference in pitch diameter is caused by the fact that the number of teeth in this case on the strain gear is less than the number of teeth on the ring gear. The difference in the number of teeth between the two gears, or the tooth differential, should be equal to or a multiple of the number of places at which the strain gear is deflected to cause tooth engagement with the ring gear. This differential would desirably be two, using a strain inducer having an elliptical contour with two lobes 75, as shown in Figures 1 and 2. As already explained, the strain gear 71 is made of a material which is elastic under the conditions of operation, and in the case of a steel strain gear, is made of relatively thin cross section so that it can be deflected easily in a radial direction.

The form of strain inducer for transmitting motion as illustrated in Figures 1 to 10 is a very simple one having two points of strain engagement of the strain gear. The strain inducer 72 has an elliptical contour, as already explained, whose major axis A is larger than the inside diameter of the strain gear 71 by an amount approximately equal to the difference in pitch diameter of the ring gear and the strain gear. The minor axis B is smaller than the inside diameter of the strain gear by approximately the same amount. When the strain inducer is inserted into a position inside the strain gear, as shown in Figure 3, it causes the strain gear to be distorted into elliptical form, with the pitch line of the teeth at the major axis equal to the pitch diameter of the ring gear as shown at 76 in Figures 4 and 8. At the position as shown in Figure 8 the pitch circles of the two gears are coincident. At the minor axis the pitch line of the strain gear teeth is smaller than the pitch diameter of the ring gear, and if a full tooth height is used, the teeth will just clear one another as shown at 77 in Figures 4 and 6. At intermediate points 78 and 80 as shown in Figures 4, 5 and 7, the teeth will have varying degrees of engagement. This condition prevails where the tooth differential is equal to the number of lobes on the strain inducer which in this case is two.

The relationship between the respective teeth can be better understood by studying the developed view of the tooth engagement in Figures 9 and 10. In the developed form it would be necessary to have the teeth of the strain gear slightly different in pitch from those of the ring gear and in the example shown the teeth on the strain gear are slightly larger. It will be understood, however, that in the circular form the pitch of the teeth of the strain gear and the ring gear is identical, and a similar relation is obtained in the developed view, since, for circular motion, the motion is measured in degrees or radians, and the internal strain gear has fewer teeth per degree or per radian than the outer ring gear.

To further emphasize the illustrations in Figures 9 and 10, the strain inducer 72' is shown as having line contact instead of contact along an inclined plane or cam surface. In Figure 9 the distance between the point where the teeth of the ring gear and the strain gear are fully meshed at the strain inducer and the point where they are fully out of mesh has been designated as S. This is one-half the angular distance between the lobes on the strain inducer, or, for a two lobe system, 90°, the angular distance between the positions of Figures 8 and 6.

As the strain inducer 72' is moved to the right in the direction of the arrow in Figure 9 toward the position shown in Figure 10, the teeth of the strain gear gradually move into engagement ahead of the strain inducer and out of engagement behind the strain inducer. At the strain inducer they are always fully meshed. When the strain inducer has moved to the position shown in Figure 10, a distance of one-half S or 45°, the strain gear has moved to the left in relation to the ring gear a distance of one-fourth tooth. For a full 360° motion or one revolution, the strain gear will move $$\frac{360}{45} \times \frac{1}{4} = 2 \text{ teeth}$$

One complete revolution of the strain wave around the periphery of the strain gear will always produce a tooth movement which is equal to the difference in the number of teeth between ring gear and the strain gear. In this analysis it has been assumed that wave shape is a linear function of revolution.

Figures 11 and 12 illustrate the relative motions with respect to the elements shown. In each of these figures it is assumed that the ring gear 70 has 200 teeth and the strain gear 71 has 198 teeth. An elliptical strain inducer 72 having two lobes is used as a driver. In the form of Figure 11, the ring gear 70 is the driven gear and the strain gear is stationary. From the motion shown in Figure 10, it will be evident that the strain gear always moves in the opposite direction to the movement of the strain inducer. Hence, with the strain gear stationary, the ring gear will move in the same direction as the strain inducer. Stated generally, the principle is that the gear that has the largest number of teeth per degree or per inch moves in the same direction as the strain inducer where the strain inducer is the driving element.

It will be seen from an analysis of Figures 9 and 10 that the tooth movement is equal to the difference in the number of teeth between the ring gear and the strain gear, in this case two teeth per revolution of the strain inducer. Since there are 200 teeth in the ring gear and it only moves two teeth per revolution of the strain inducer, it would require 100 revolutions of the strain inducer to produce one revolution of the ring gear, therefore the gear ratio of input to output is 100 to 1.

If now we apply a similar analysis to Figure 12 it will be evident that here the strain gear 71 moves two teeth per revolution of the strain inducer 72. However, in the case of Figure 12, there are two important differences, first, the direction is opposite to the motion of the strain inducer, and secondly, it moves the same distance, that is, two teeth, but in a smaller total number of teeth, that is, 198. Therefore, for Figure 12 the gear ratio is 198 to 2 or 99 to −1 (since it is in the opposite direction the 1 is negative).

In the analysis so far, it has been assumed that the strain inducer is the driving element. Since, however, strain wave gearing can be made to have a relatively high mechanical efficiency, any of the three elements can be utilized as the driving element with either of the remaining elements as the driven element. For example, in Figure 11 the strain gear may be stationary, with the ring gear the driver, and the strain inducer driven. When used in this manner, the driven strain inducer makes 100 revolutions for every revolution of the driving ring gear.

While we have in this initial simplified analysis assumed a condition in which the strain inducer is internal and the strain gear is located outside the strain inducer and inside the ring gear, it will be evident as later explained that these features can be reversed, for example placing the strain inducer on the outside, and the strain gear inside it, and the ring gear on the very inside.

The gear ratio is the function of the difference in the diameter of the two gears and is entirely independent of the tooth size since the number of teeth in each gear is directly related to their pitch diameters. The teeth, therefore, could be made of infinitesimal size, or in fact there may be no teeth at all, with merely frictional contact engagement, and the gear ratio will not be affected in the least by any such change in construction. The number of complete strain wave revolutions around the strain gear for one revolution of the output element is equal to the difference in pitch diameter of the two gears divided into the pitch diameter of the driven element. For example, let us assume that the numbers as indicated in Figure 11 constitute one hundredths of an inch instead of teeth. Then the ring gear would have a circumference of 2.00 inch and the strain gear would have a circumference of 1.98 inch. The number of turns that the driver or strain inducer would turn to produce one revolution of the ring gear would then be:

$$\frac{2.00}{2.00-1.98} = \frac{2.00}{0.02} = \frac{100}{1}$$

ANALYSIS OF WAVE AND TOOTH FORM

The tooth size, shape and tooth differential, greatly influence the percentage of teeth which are in engagement. If the teeth on the ring gear are proportioned so that their height is equal to the deflection and their included angle is properly chosen, the sharp pointed tooth on the strain gear would at all times be in contact with the mating tooth on the ring gear. Under these conditions, it would be possible to have 100 percent of the teeth in contact at all times, all of the teeth in varying degrees of mesh. If the height of the teeth is decreased to less than the deflection or if the included angle is changed, the percentage of teeth in contact is decreased. It is therefore very easy to manufacture a tooth configuration which has a percentage of teeth in contact in the range from 45 to 55 percent, and strain wave gearing is therefore very unusual in having in many cases more than 50 percent of the teeth in contact at all times.

Preliminary to the development of the proportions and included angle for the teeth, it is necessary to determine the strain wave shape. Table 1 lists data determined experimentally and used in plotting the strain wave in Figures 13, 15, 17 and 18. The data in Table 1 were determined with extreme care. A hardened, tempered, and ground steel ring consisting of a bearing steel alloy, SAE 52100, having an inside diameter of 1.9685 inches concentric with an outside diameter of 2.3810 inches within measurable limits of plus and minus 0.0001 inch was deflected over two bars each having a radius of 0.4375 inch. The two bars were located at diametrically opposite points on parallel centers inside the ring. The ring was centered on a dividing head with a 35 power microscope determining the actual rotative position of the table itself which was graduated in 0.150. Radial measurements or measurements of the height of the wave were read at 6 power magnification on a dial indicator having graduations of 0.0005 inch to the closest 0.00012 inch. Each wave was measured on both sides of the wave crest. The readings from the two sides of the same wave were averaged to correct for the slight lack of phase relationship with the rotary readings. These data are tabulated in Table 1. Data obtained from other rings of entirely different proportions and under different deflection loads indicate that this curve, at least for the degree of strain which is important in strain wave gearing, is the same regardless of proportions or deflections. This agrees with strain data obtained from the literature on proof rings.

*Table 1*

[360° measurement of 2.3810″ ring strained elliptic to 2.4145″ max. and 2.3502″ min. Readings on opposite sides of each crest have been averaged. Accuracy of readings ±.00012″ ±.03°.]

| Wave No. 1 Deflection Per 6° (.001″) | Wave No. 2 Deflection Per 6° (.001″) | Average Deflection Per 6° (.001″) | Deflection /6° for 28.6 =3.0846 (.001″) | Difference × Sin 28.6° (.001″) |
|---|---|---|---|---|
| 0.00 | 0.00 | 0.00 | −8.426 | |
| 0.18 | 0.18 | 0.18 | −5.342 | |
| 1.00 | 1.00 | 1.00 | −2.258 | |
| 2.43 | 2.43 | 2.43 | 0.827 | 0.77 |
| 4.37 | 4.43 | 4.40 | 3.912 | 0.23 |
| 6.62 | 6.68 | 6.65 | 6.996 | 0.17 |
| 9.56 | 9.68 | 9.62 | 10.081 | 0.22 |
| 12.87 | 12.87 | 12.87 | 13.165 | 0.14 |
| 16.25 | 16.25 | 16.25 | 16.250 | 0.00 |
| 19.62 | 19.68 | 19.65 | 19.335 | 0.15 |
| 22.75 | 22.87 | 22.81 | 22.419 | 0.19 |
| 25.75 | 25.87 | 25.81 | 25.504 | 0.15 |
| 28.25 | 28.37 | 28.31 | 28.588 | 0.13 |
| 30.31 | 30.25 | 30.28 | 31.673 | 0.67 |
| 31.68 | 31.68 | 31.68 | 34.757 | |
| 32.12 | 32.12 | 32.12 | 37.842 | |

Figure 13 plots a curve for a strain gear having a two lobe strain inducer. There are therefore two complete waves in 360° or one complete revolution. The ordinate is tooth engagement in 0.001 inch and the abscissa is degrees in the revolution. The height of the wave is equal to the total deflection. This is referred to as tooth engagement because it is this up and down or actually radial in and out motion that produces tooth engagement and disengagement in circular strain wave gearing. Straight lines are superimposed on the two sides of the wave to obtain the closest possible match over as great a percentage of the distance as possible. When the height of the triangle formed in this manner is 1.44 times greater than the deflection, the match over more than 50% of the curve is within ±0.00025 inch. This is explained in detail in reference to Figure 15 and Table 1.

The dots shown in Figure 13 on the strain wave are plotted from actual data measured from a strained ring. These dots also show the progressive movement of the teeth on a strain gear with movement of the strain inducer. This wave of course is purposely exaggerated in height to properly illustrate the wave shape and facilitate accurate plotting. If the degrees (revolution) were shown to the same scale as the deflection, the wave would be approximately 125 times as long as illustrated. This wave at any instant is superimposed on the circumference of a circle, and height of the total wave or the deflection is approximately twice the radial displacement of the peaks of the wave from this circle. If it were plotted in this manner, the deflection for that portion of the wave having a greater radial distance from the center than the circumference would be given as "plus" strain. The other portion of the wave having a lesser radial distance would be given as "minus" strain. The position before strain (or the circumference of the relaxed ring) is indicated in Figure 15 as the "undeflected position." However, it will be evident that measurement of the wave and all of the calculations are simplified by considering the total deflection as being measured from a base line coincident with that portion of the wave which has the least radial distance from the center.

It will be evident upon analysis that the shape of the wave drawn to a base line equal in length to the circular pitch, that is, the distance from one tooth to the next, will accurately outline the tooth form. When drawn to these proportions the wave looks essentially as shown in Figure 13, with the abscissa equal to the circular pitch for two teeth. In order to illustrate this relationship, the deflection wave shown in Figure 14a is represented as a linear function of revolution. The deflection is made exactly equal to the tooth height as shown in Figure 14b. Thus it will be seen that a 90° revolution of a two lobe strain inducer in strain wave gearing produced according to these proportions will cause a change in radial deflection equal to the tooth height for the teeth that were either fully engaged or fully disengaged.

For properly shaped teeth, 100% of the teeth under this condition would be in contact, but in various degrees of engagement. Proceeding from the base line in Figures 14a and 14b, or from the disengaged position, one side of the teeth on the strain gear will become progressively more engaged with one side of the teeth on the ring gear as the apex of the curve is approached. At the point of 45° revolution, the teeth will be engaged 50% or deflection/2. At 90° revolution they will be fully engaged. Proceeding beyond 90°, the teeth will become progressively less engaged on the next 90° revolution. Here, however, the opposite side of the tooth is in contact. It is an unusual feature of the gearing of the present invention that for the same direction of drive successively opposite sides of the same tooth engage as the teeth advance.

Hence for 90° revolution the phase relationship of the teeth changes 180° or it is one-half tooth out of phase. This accordingly indicates that the teeth, for this shape of strain wave, should be equal in height to the deflection and have a base line equal to the out-of-phase relationship for 180° revolution. The included angle is determined by this relationship. The sides of this angle are straight since the deflection chosen has a linear relationship with revolution. Consequently the curve of Figure 14a is fully representative of tooth form if the abscissa is equal to the circular pitch of one tooth.

From Figure 14 it is possible to produce a generalized formula for circular pitch for use in strain wave gearing calculations. The nomenclature as applied to this calculation and as appearing on Figure 14 is as follows:

$d$ = total deflection-difference in pitch diameters.
$D_R$ = pitch diameter of ring gear
$D_E$ = pitch diameter of strain gear.
$p$ = circular pitch
$n$ = number of lobes on strain inducer
$N_R$ = number of teeth on ring gear
$N_E$ = number of teeth on strain gear
$d = D_R - D_E$ $$D_R = \frac{N_R p}{\pi}$$

$$D_E = \frac{N_E p}{\pi}$$

$n = N_R - N_E$

Then $$d = \frac{N_R p}{\pi} - \frac{N_E p}{\pi}$$

therefore the circular pitch formula for strain waving gear is $$p = \frac{\pi d}{n}$$

Here the circular pitch is reduced to a definite relationship with deflection and number of lobes on the strain inducer. As a result, the tooth form is dependent only upon the number of lobes on the strain inducer. In producing Figure 14, it was assumed that the curve is a linear function of revolution. This, of course, is not strictly true for a natural strain wave. In order to ascertain the degree of linearity obtainable with a strain wave, measurements of an actual wave were carefully taken as outlined above and as tabulated in Table 1. In this table, the first column shows the measurements obtained from one of the waves and the second column shows the measurements obtained from the opposite or other wave. In the third column these have been averaged and these data are used to determine linearity of the portion of the strain wave. These data were also used to plot the curves of Figures 13, 15, 17 and 18. The maximum deviation of any reading from this average was 0.00006 inch.

The fourth column of Table 1 shows the deflection or ordinate position of a 28.6° line for each 6° revolution of the abscissa. The ratio of the ordinate to the abscissa was calculated as follows:

$$6° \text{ abscissa} = \frac{p}{2} \Big/ \text{divisions} \times \cot 28.6° \text{ in abscissa}$$

$$= \frac{\pi d''}{2n} \Big/ \frac{360°}{2n \times 6°} \times 1.83413$$

$$= .0030846'' \text{ ordinate}$$

The 28.6° line was chosen as the closest match with the desired objective of having 50 percent of the teeth in contact at the center of tooth tolerance. This also simplifies the tooth form and calculation. It matches the side of the 1.44d triangle to within 0.0000011 inch per abscissa division of 6°.

The point on Table 1 which corresponds numerically to 16.25 was made coincident for purposes of comparison. This point is approximately the center of the tooth contact area. The differences between the deflection for the curve in the third column and the straight line in column 4 was multiplied by the sine of 28.6° to determine the actual distance between these two points. These distances were tabulated in the fifth column. As indicated here, linearity has been achieved within a quarter of a thousandth of an inch. Preliminary calculation indicates that this quarter of a thousandth of an inch can be fully absorbed under applied load by the minute deflection of all associated parts without increasing the stress at the maximum stress point. Hence the tooth can be made with straight sides over the tooth contact area as in the discussion with respect to Figure 14. Formula 2 will then apply to circular pitch of the teeth and the angle of the side, or the pressure angle, will be a function of this pitch and the deflection in the following manner:

$$\text{Pressure angle} = \tan^{-1} \frac{\pi d}{2n} \Big/ 1.44d$$

$$= \tan^{-1} \frac{\pi}{2.88n}$$

$$= \tan^{-1} \frac{1.091}{n}$$

Figure 15 indicates these results graphically, plotting deflection against revolutions in degrees. This plots the experimental data with the 1.44d triangle superimposed.

While it is true that strain calculation made from proving rings indicate that the form of the strain wave is independent of ring dimension, verification of this feature was obtained by measuring another ring of entirely different proportions, which, when compared with the ring previously measured are as follows:

| | | |
|---|---|---|
| Outside diameter | percent | 140 |
| Inside diameter | do | 160 |
| Thickness | do | 49 |
| Deflection | do | 200 |
| Deflecting arbor radius | do | 35 |
| Relaxed ovality | inches | .012 |
| Variation in wall thickness | do | .0018 |

As might be expected, the uniformity of the wave for this ring was not as good as for the more nearly perfect ring from which the data in Table 1 were plotted. It should be noted, however, that throughout the tooth contact area the linearity was excellent, averaging 0.0001 inch with a maximum of 0.0003 inch. At no place in the entire wave did the two waves differ by more than 0.0004 inch. To illustrate this match, alternate dots marked with a light stroke on the right hand portion of the wave of Figure 15 have been plotted from this latter ring. It would appear from the experimental data obtained from these two dissimilar rings that there is a strong indication that the wave form within the range used in strain wave gearing is independent of ring dimension or deflection.

In order to determine if the number of lobes on the strain inducer would cause an alteration in the wave shape, a ring was radially distorted at three 120° points and measured. The results of these measurements are plotted in Figure 16, plotting deflection against revolutions in degrees. A line was superimposed over its curve in accordance with Formula 3, which for the three lobe strain inducer has a pressure angle of 20°. Deviation of the curve from this straight line was then calculated in the same manner as was done above for the two lobe system. The results are shown on Figure 16 for the tooth contact area. It should be noted that there are fewer points on the three lobe curve than on the two lobe curve. This is due to the fact that the three lobe curve has a curve length of 360°/3 while the two lobe has a curve length of 360°/2. The divisions in both cases are 6°.

On Figure 17 the same data are resolved into a practical tooth form. The teeth on both gears have been made identical except for the angle. The pressure angle on the strain gear has been increased to compensate for the angularity of the strain wave with the pitch circle circumference during tooth contact. To correct for the slight change in angle caused by the tooth being on an arc, the pressure angle of the ring gear is given for the tooth and the pressure angle for the strain gear is given for the space between teeth. Fortunately, the shape of the strain wave permits provisions for more than adequate fillets, clearances, and tolerances without materially reducing the theoretical maximum tooth bearing area. This bearing area is the portion of the curve that coincides within manufacturable limits with a straight line. Since the height of the triangle which has sides in coincidence with this curve is 1.44d and since the coincidence portion is about 0.77d, approximately 46% of the triangle height can be used for fillets, clearances and partially for tolerances.

The pitch line for the ring gear is represented as a straight line. The effective pitch line of the strain gear varies radially from the center as the strain inducer is rotated. Coincidence between the pitch line of the ring gear and the strain gear occurs only at the extreme top or crest of the strain wave. The center of a tooth on the strain gear at the pitch line shown by a heavy dot will move radially in and out as the strain inducer moves the wave at the tooth. After the strain inducer has moved 360°/2n, the center of the tooth shown will have been displaced radially toward the center by the distance equal to the deflection.

By analysis of Figure 14 it has been determined that the shape of the strain wave also describes the theoretical tooth shape. While these waves are the same in form, they are of an entirely different scale. By representing the wavelength as being equal to the circular pitch, it is easier to visualize tooth relationship. In Figure 18, plotting deflection against circular pitch, the center of the line of a tooth is moved along such a wave to illustrate the relative position of mating teeth throughout their travel. It must be remembered, however, that a rotational tooth movement equal to "circular pitch" requires a rotation of the strain inducer of 360°/n. The rotational increment of the strain inducer for the tooth positions shown in Figure 18 is 48°/n.

For the purpose of the discussion herein, it has been assumed that the flexible or strain gear rotates (or remains rotatively stationary) as a unit and that all parts of this gear are in constant angular relation with all other portions thereof. More rigorous treatment demonstrates that rotation of the radial deflection of a ring causes a small circumferential shift of portions of the ring which causes angular motion of one part of the ring periphery relative to another part. Introducing such rigorous treatment herein is to be avoided as it needlessly complicates the analysis. The consequences of this circumferential shift tends to enhance all features outlined herein. Specifically the tooth engagement is moved around toward the point of maximum deflection so that the engaged teeth are further in mesh, the tooth sliding in markedly reduced, increasing maximum efficiency, the tooth width at the pitch line is increased and the tooth pressure angle becomes considerably less critical.

Figures 17 and 18 also illustrate that at the crest of the wave, when the two pitch lines are coincident, the teeth are fully in mesh but they are not in contact with each other. This will be evident by considering the relationship of the fully engaged teeth in Figure 17. The space on each side of the strain gear tooth is not clearance but is the space necessary for the teeth on the strain gear to travel along the wave from one side of the tooth space to the other side. While travelling a distance equal to the circular pitch, a tooth on the strain gear progressively goes through the following cycle:

(1.) 13 percent travelling from the adjacent tooth space to the tooth contact area of the tooth space it is entering.

(2.) 27.5 percent travelling along the tooth space area on the entering side of the tooth space.

(3.) 19 percent travelling from the tooth contact area on the entering side of the tooth space to the tooth contact area on the exiting side.

(4.) 27.5 percent travelling along the tooth contact area on the exiting side of the tooth space.

(5.) 13 percent travelling from the exiting side of the tooth contact area to the dividing line with the next tooth space that it is entering.

Since the tooth is not in contact at the crest of the wave, backlash is easily controllable by providing a means of adjusting deflection. It is quite possible in accordance with the invention to produce a construction having zero backlash. Also, this cycle of operation tends to pump lubricant to the working surfaces.

The pitch line of the strain gear in relation to the tooth is always the same but the pitch line in reference to the center of the gear varies in accordance to its position on the strain wave. While the strain gear is in the strained condition this pitch line is at all times coincident with the strain wave. It is from this effective pitch line that all calculations are made with the exception of the dimensions to the tooth in the relaxed or unstrained condition. Inducing the wave into the strain gear tends to stretch or increase the periphery of the ring. Hence the relaxed pitch diameter does not equal the pitch diameter of the ring gear minus deflection. It is slightly smaller than this. For the two lobe strain inducer, the relaxed pitch diameter is smaller by 0.0416d. For practical considerations, the amount of difference can advantageously be utilized as the tolerance to be added to the ring gear pitch diameter and subtracted from the effective strain gear pitch diameter. Then gears made to the center of the tolerance limits will be theoretically correct.

Gears which are made to the basic dimensions of Figure 17 will have 55 percent of their teeth in contact—one-half of these on the tooth contact area of one side of the teeth and the other half on the other side of the teeth. Since these teeth are actually opposing each other, the gear can be made completely without backlash. Also, 27.5 percent of the teeth are actively load bearing when acted upon by a torque.

When the pitch line of the strain gear is coincident with the pitch line of the ring gear at the crest of the strain wave and the teeth are made to the basic dimensions shown in Figure 17, the rotative clearance between the tooth on the strain gear and the tooth space in the ring gear at the approximate center of the tooth contact area is 0.0019p. For a tooth having a circular pitch of 0.0525 inch, the clearance would be 0.0001 inch. The fractional dimensions listed on Figure 17 are not to be construed as approximations but are accurate to at least four decimal places.

*Table 2*

RELATIONS $a$—Addendum $=\frac{7}{16}d=\frac{7n}{16P}=.139np$ $b$—Dedendum $=\frac{9}{16}d=\frac{9n}{16P}=.179np$ $c$—Clearance $=\frac{d}{8}=\frac{n}{8P}=.04np$ $C$—Contact ratio = percent of teeth in contact = 45 to 55

$d$—Height of strain wave = total radial deflection
$$=\frac{n}{P}=\frac{np}{\pi}=\frac{D_D}{R}=D_R-D_E$$

$D$—Pitch diameter $=\frac{Nd}{n}=\frac{N}{P}=\frac{Np}{\pi}$ $D_R$—Pitch diameter of ring gear
$$=\frac{Nd}{n}=\frac{N}{P}=\frac{Np}{\pi}=D_E+d=D_1+\tfrac{7}{8}d$$

$D_E$—Effective or dynamic pitch diameter of strain gear
$$=\frac{Nd}{n}=\frac{N}{P}=\frac{Np}{\pi}=D_R-d=D_0-\tfrac{7}{8}d$$

$D_S$—Relaxed or static pitch diameter of strain gear $=D_E-.0416d$ when $n=2$; $=D_E-.055d$ when $n=3$ $D_D$—Pitch diameter of driven gear $=\frac{N_Dd}{n}=\frac{N_D}{P}=\frac{N_Dp}{\pi}$ $D_F$—Pitch diameter of fixed gear $=\frac{N_Fd}{n}=\frac{N_F}{P}=\frac{N_Fp}{\pi}$ $D_I$—Inside diameter
$$=\frac{Nd}{n}-\tfrac{7}{8}d=\frac{N}{P}-\tfrac{7}{8}d=\frac{Np}{\pi}-\tfrac{7}{8}d=D_R-\tfrac{7}{8}d$$

$D_0$—Outside diameter
$$=\frac{Nd}{n}+\tfrac{7}{8}d=\frac{N}{P}+\tfrac{7}{8}d=\frac{Np}{\pi}+\tfrac{7}{8}d=D_E+\tfrac{7}{8}d$$

$n$—Number of lobes on strain inducer = number of places of tooth engagement $=Pd=\frac{\pi d}{p}=\frac{dN}{D}$ $N$—Number of teeth $=\frac{Dn}{d}=DP=\frac{\pi D}{p}$ $N_D$—Number of teeth in driven gear
$$=\frac{D_Dn}{d}=D_DP=\frac{\pi D_D}{p}=nR$$

$N_F$—Number of teeth in fixed gear $=\frac{D_Fn}{d}=D_FP=\frac{\pi D_F}{p}$ $p$—Circular pitch $=\frac{\pi d}{n}=\frac{\pi}{P}=\frac{\pi D}{N}$ $P$—Diametral pitch $=\frac{n}{d}=\frac{\pi}{p}=\frac{N}{D}=\frac{7n}{16a}=\frac{9n}{16b}$ $R$—Gear ratio
$$=\frac{D_D}{d}=\frac{PD_D}{n}=\frac{\pi D_D}{pn}=\frac{N_D}{n}=\frac{D_D}{D_D-D_F}=\frac{N_D}{N_D-N_F}$$

$t$—Thickness of tooth at pitch line $=\frac{11d}{8n}=\frac{11}{8P}=\frac{7}{16}p$ $W$—Working depth (tooth contact area) $=.77d$ (active profile $.77d/\cos\phi$)

$\phi$—Pressure angle, ring gear $=\tan^{-1}\frac{1.091}{n}$ $\phi_S$—Pressure angle, strain gear
$$=\tan^{-1}\frac{1.091}{n}+\tan^{-1}\frac{.458dn}{r}$$

BASIC RELATIONS

Table 2 shows the relationship of various parameters which are important in connection with the calculation of strain wave gearing. Whenever desirable these have been expressed in terms of deflection, diametral pitch and circular pitch. Many additional expressions can be derived from these data.

Many of these terms are common with standard gear terminology. In many instances, however, there are new terms or new definitions necessary when these terms are applied to strain wave gearing. Contact ratio for strain wave gearing is designated by "C" and expressed as the percentage of total teeth in contact. This is the quotient of the number of teeth which are in actual contact with mating teeth (considering both gears) divided by the total number of teeth in both gears. Where strain wave gearing are designed according to the preferred form in accordance with the present invention, the contact ratio will be 55 percent, and with minimum tooth tolerances, 45 percent. Deflection "d" is a new term applicable only in strain wave gearing. It is the dimension of the height of the strain wave in the strain gear equal to the difference in (1) the radial distance from the center to the crest of the wave and (2) the radial distance from the center to the base of the wave.

The deflection in the strain gear introduces another new term $D_E$. This is the effective working diameter of the strain gear which is equal to the pitch diameter of the ring gear minus deflection. Representing this as a diameter may not be strictly accurate since the strain wave has altered the circumference to either an elliptic or slightly triangular configuration. However, if we consider it as the diameter of a circle on which the strain wave center is superimposed, it will greatly facilitate calculation. When the strain gear is manufactured, or when it is not assembled into a complete gearing unit, the pitch diameter in this relaxed form is smaller than the effective or working pitch diameter by a slight amount. This relaxed diameter is designated $D_S$. In practice this difference is included on the strain gear drawing as negative tolerance to the effective pitch diameter. An equivalent positive tolerance would be given to the pitch diameter of the ring gear. Accordingly, gears made to the center of the tolerances would be theoretically correct.

The subscripts D and F applied to D and N are required for the determination of the gear ratio. The designation for gear ratio has been changed from the customary $m_G$ to R since the standard means of determining gear ratio does not apply.

Throughout this description of strain wave gearing it has been assumed that $n$ was equal to the difference in the number of teeth in the two gears and the tooth relations were developed accordingly. While this relationship is not mandatory, many of the advantages of strain wave gearing are sacrificed by having the tooth difference a multiple of $n$ without deriving any compensating advantages in most cases.

There is a slight alteration in the definition of the working depth W. In strain wave gearing it is the radial length of the active profile. This is the radial distance that mating teeth are in actual contact. The teeth interengage up to twice the addendum as in standard gears but from $0.77d$ to this depth they are not in contact. In the calculations of the pressure angle for the strain gear, consideration has been given to the slight angular difference caused by the strain gear being deflected. This requires the pressure angle on the strain gear to be larger than the pressure angle on the ring gear. The angular difference is an angle whose tangent is $1.44d$ divided by the length of the arc for one-half of a strain wave. With this correction, the contact surfaces of the two gears should be parallel as they slide over each other. For a normal size steel strain gear this angular correction is approximately one degree and for other than precision gears, this correction might advantageously be divided between the two gears as angular tolerance.

DESIGN FORMULAE

Since the interaction between the teeth is dissimilar to that of standard gearing it is questionable whether standard gear formulae are applicable. This is particularly true of the Hertz equation which deals primarily with conditions of point or line contact. In strain wave gearing, properly proportioned, there is sliding surface contact, with the action of wear, elasticity and skewing of the strain wave under load tending to maintain this surface contact. Since preferably over 50 percent of the teeth are in engagement, inaccuracies of a few teeth tend to become corrected as the gear wears. Considering the tooth as a beam also does not appear applicable due to the pressure angle relationship to the tooth size. Shearing strength, tooth contact pressures, tensile stress in the deflected strain gear and the radial load on the stress inducer appear to be determining characteristics in strain wave gearing. Formulae for these have been developed.

$\sigma_{max}$ = Maximum tensile stress in deflected ring at outside crest or wave, p.s.i.
$\sigma_1$ = Tensile stress in deflected ring at wave base, p.s.i.
$\sigma_s$ = Shear stress, p.s.i.
$\phi$ = Pressure angle, degrees
$C$ = Percentage of teeth in contact (tolerance center) = .50
$d_1$ = Deflection (diametral), inches
$E$ = Modulus of elasticity, p.s.i.
$e_m$ = Mechanical efficiency
$f_1$ = Coefficient of sliding friction, gear teeth
$f_2$ = Coefficient of friction, strain inducer
$F$ = Face width of gear, inches
$l$ = Width of ring, inches
$n$ = Number of lobes on strain inducer
$r$ = Radius of ring, inches
$S_p$ = Tooth contact pressure, p.s.i.
$S_w$ = Surface endurance limit, p.s.i.
$t$ = Thickness of ring, inches
$T_1$ = Input torque, pound inches
$T_0$ = Output torque, pound inches
$W_1$ = Radial load required to deflect ring, pounds
$W_T$ = Radial load on strain inducer with applied output torque, pounds

FORMULAE $$\sigma_{max} = 2.95 \frac{td_1 E}{r^2} \text{ (when } n=3\text{)} \quad (4)$$

$$\sigma_1 = 1.56 \frac{td_1 E}{r^2} \text{ (when } n=3\text{)} \quad (5)$$

$$W_1 = 2.6 \frac{d_1 l t^3 E}{r^3} \text{ (when } n=3\text{)} \quad (6)$$

$$\sigma_{max} = 1.03 \frac{td_1 E}{r^2} \text{ (when } n=2\text{)} \quad (7)$$

$$\sigma_1 = .59 \frac{td_1 E}{r^2} \text{ (when } n=2\text{)} \quad (8)$$

$$W_1 = .56 \frac{d_1 l t^3 E}{r^3} \text{ (when } n=2\text{)} \quad (9)$$

$$T_0 = \frac{\pi}{4} \frac{r^2 F S_w \cos \phi}{\sin \phi} \quad (10)$$

$$T_0 = .63 r^2 F \sigma_s \quad (11)$$

$$T_0 = T_1 R e_m \quad (12)$$

$$T_0 = T_1 \times \frac{1 - f_1 \tan \phi}{\tan \phi + f_1} \times \frac{1 - f_2 \frac{.458 dn}{r}}{\frac{.458 dn}{r} + f_2} \quad (13)$$

$$W_T = W_1 + \frac{T_0}{nr} \times \frac{\tan \phi + f_1}{1 - f_1 \tan \phi} \quad (14)$$

$$\sigma_s = 1.6 \frac{T_0}{r^2 F} \quad (15)$$

$$S_p = 1.27 \frac{T_0 \sin \phi}{r^2 F \cos \phi} \quad (16)$$

$$e_m = \frac{1}{R} \times \frac{1 - f_1 \tan \phi}{\tan \phi + f_1} \times \frac{1 - f_2 \frac{.458 dn}{r}}{\frac{.458 dn}{r} + f_2} \quad (17)$$

$$T_1 = \frac{T_0}{R e_m} \quad (18)$$

$$T_1 = T_0 \times \frac{\tan \phi + f_1}{1 - f_1 \tan \phi} \times \frac{\frac{.458 dn}{r} + f_2}{1 - f_2 \frac{.458 dn}{r}} \quad (19)$$

Formulae 4 to 9 are given in two groups, one being for use when $n=3$ and the other when $n=2$. Introducing $n$ into the formulae would have made it needlessly complex, particularly since there appears to be no advantage or need for a strain gear with $n$ greater than 3 for ordinary purposes. These formulae have been derived from standard stress and load formulae in the literature. They have been reduced to a form most applicable to strain wave gearing. It has been assumed that the strain gear is a ring of rectangular shape and that the radius is to the neutral axis of the ring. Deflection $d_1$ is given as a diametral change in preference to a radial change as this dimension is almost identical to deflection $d$, that is, the height of the strain wave. For all practical purposes these values may be assumed to be the same.

Formulae 4 and 7 are used to calculate the maximum stress which is encountered in any portion of the strain gear. It is for the outside surface of the ring at the crest of the wave and assumes point loading by the deflecting media. Loading over an area or by a large radius decreases the tensile stress at this point. It will be noted from Formulae 5 and 8 that the stress at the base of the wave is slightly more than half as much as at the crest. This could be deduced by inspection of the wave form which has a more gentle curvature at the base than at the crest. By an appropriate lobe configuration on the strain inducer, the stress at the base and crest can be made the same. However, this changes the wave shape and requires different tooth configuration.

The validity of Formula 4 has been checked by photoelastic means using (1) two different diameter rings, (2) three different thicknesses of rings and (3) six different deflections. In every instance the photo-elastic results were slightly lower than the value derived by the formula varying from one percent less to ten percent less. Since the increase in length of the circumference from the internal load which adds to the tensile stress does not add to the static fringe pattern, it would appear to be normal for the photo-elastic results to be somewhat less.

Formulae 6 and 9 determine the radial load imposed on the strain inducer for deflecting the strain gear. This is the minimum radial load on the strain inducer when no power is being transmitted. The load data derived from these formulae are used in Formula 14 to determine the total or maximum radial load on the strain inducer.

Formulae 10 and 11 are used to determine the maximum permissible output torque, Formula 10 being based on the surface endurance limit on surface compression of the contact surfaces as usually defined in connection with gearing, and Formula 11 on the minimum shear strength of the teeth. Output torque in pound-inches is used instead of the actual load in pounds on a tooth since, for strain wave gearing, 50 percent of the teeth are in contact and the load is equalized in the gear arrangement to produce torque without any side thrust on bearings or shafts. As will be explained, this is a great advantage of strain wave gearing.

In Formula 10, $$\text{Torque}^{\text{lb."}} = \frac{r'' \times 2\pi r'' \times .5 \times .5 \times F''}{2 \sin \phi} S_W^{\text{p.s.i.}} \cos \phi$$

If the first $r$ were transposed it would cancel out with the inches in torque and convert it to load. The next term is the circumference of the pitch circle which, when multiplied with 0.5 represents the amount of this circumference that has teeth in contact with the main gear. Since only half of the engaged teeth are positioned to develop power in one direction, this must be multiplied by 0.5. This, then, represents the length of the pitch circle circumference that has teeth engaged to resist the applied torque. Dividing this by the sine of the pressure angle converts it to the total length of the contact area. However, since the teeth are moving in and out over this length, it must be divided by two to obtain the average. Multiplying this length by the face gives the total area in contact at any instance. Finally, this must be multiplied by the surface endurance limit for the material from which the gears are made, and since the force component is at an angle, this must be multiplied by the cosine of the pressure angle. In most instances the surface endurance limit does not appear to be the limiting factor in torque development with strain wave gearing.

In Formula 11, $$\text{Torque}^{\text{lb."}} = r'' \times 2\pi r'' \times .5 \times .5 \times .403 \times F'' \times \sigma_s^{\text{p.s.i.}}$$

Again, the first $r$ is to convert torque to load.

The following three terms are as outlined in Formula 10, to find the length of the pitch circle that has teeth resisting applied torque. The next term 0.403 is average percentage of circular pitch that is in shear parallel to the pitch circle. Multiplying these by the face gives the number of square inches in shear. Multiplying by the minimum shear strength of the material completes the equation. Formula 12 is an obvious relationship of the output torque to the input torque and is inserted to introduce the similar relationship of Formula 13 where gear ratio and mechanical efficiency are expressed in terms of tangent and coefficients of friction. If the coefficients of friction are assumed to be zero then the efficiency would be 100 percent and $T_0$ would equal $T_1R$—hence, the last two expressions of Formula 13 are equal to R when $f_1$ and $f_2$ are equal to zero. Under these conditions R is equal to the product of the reciprocals of (1) the tangent of the tooth pressure angle, and (2) the tangent of the angle of the strain wave to the circumference during tooth contact. This latter angle is an angle between two lines drawn tangent to the effective pitch circle and the strain wave at the point where the strain wave crosses the pitch circle. If there were no friction, the supplied torque would exert a force normal to the surfaces represented by these angles. However, in the presence of friction the resultant forces will be inclined from the normal by the amount of angle of friction. If the tangent of the sum of these angles is expressed by functions of the component angles and $f$ equals the tangent of the angle of friction, the resulting equation is as expressed in Formula 13.

In Formula 14, where the expression dealing with the pressure angle is the reciprocal of the one in Formula 13, the load imposed by the output torque and friction is added to the initial load required to deflect the ring. This gives the total radial load which must be withstood by the strain inducer in delivering a given output torque. In the design of the strain inducer using balls or rollers having point or line contact, consideration must be given to this radial load.

Formula 15 is a transposition of Formula 11 and is used to determine the shear stress with a given output torque. Formula 16 is a transposition of Formula 10. However, "surface endurance limit $S_W$" has been changed to "tooth contact pressure $S_p$" as the formula is used to determine the contact pressure on the active profile of the teeth with a given torque output.

Mechanical efficiency of the entire strain wave gear system is calculated by Formula 17. As was seen in Formula 13, without friction, the last two expressions would be equal to R. If this were divided by R the results would be 1 or 100 percent efficiency. With friction, a lesser value is obtained representing the percentage of transmitted power. A strain gear to the following dimensions would have an efficiency of 82 percent.

| | |
|---|---|
| Diameter, $D_D$ _____ inches__ | 4 |
| Lobes, $n$ _____ | 2 |
| Deflection, $d$ _____ inches__ | .04 |
| Coefficient $f_1$ _____ | .05 |
| Coefficient $f_2$ _____ | .0015 |
| Ratio, $D_D/d$ _____ | 100/1 |

This efficiency value is for an entire gear reduction unit. Friction in the input and output bearings is negligible since there are no thrust or radial forces in strain wave gearing. In this example, coefficients of friction were chosen that appear to be a normal average under normal lubricating conditions, $f_1$ being for a lubricated surface sliding and $f_2$ for rolling. If these two coefficients are reduced to the lowest value which appears to be commercially feasible, the efficiency would be 96 percent. If the coefficient of friction of both $f_1$ and $f_2$ were doubled, a condition representative of poor workmanship and poor lubrication, the efficiency would be 69 percent.

Formula 18 is a transposition of Formula 12. Formula 19 is a transposition of Formula 13.

These formulae were developed by analysis of tooth motion using data extrapolated from standard engineering practice. It is believed that specific experimental tests on strain wave gearing will undoubtedly bring about modifications to these formulae and may possibly introduce other parameters. Until such time as actual tests have established different values the conservative values from extrapolated data should be used.

DISTINCTIVE FEATURES

The radically different principles upon which the operation of strain wave gearing depends produces parameters differing considerably from those normal for conventional gearing. These differences are outlined and discussed in the following paragraphs.

Many of these features are interrelated and consequently in the discussion of one feature others may be involved. In many instances there is only a distinctive difference if some of the other parameters are comparable—for example, "torsional rigidity of output" should not be expected with a gear which features "light weight."

*Adjustable freedom from backlash.*—Tooth interengagement in strain wave gearing is the result of the radial deflection of the relatively thin ring strain gear. Engagement is on both sides of the crest of this deflection with the tooth contact area on the strain gear on the side of the tooth toward the crest of the wave. Directly at the crest of the wave, and for approximately 10 percent of the tooth pitch on each side, the teeth are in mesh but not in contact. By making the strain inducer capable of adjusting the deflection, a gear system with backlash can have it removed by increasing the deflection to the point where the crest of the wave is radially deflected further into the mating tooth spaces until the teeth at each side come into contact.

As in standard gearing which has its center distance changed, this partially destroys the theoretical tooth relationship. However, in strain wave gearing this does not appear to have a marked deleterious effect as the angle change from the theoretical parallel mating surfaces is minute. Since the strain gear is a relatively thin gear, by increasing the deflection the crest can be made to "spring load" the contacting piece by changing or skewing the shape of the strain wave. A slight amount of this is desirable to eliminate all backlash and to preload the piece to assure freedom from backlash after high spots on the teeth have been worn away. Increasing the deflection beyond a moderate spring load, however, is not recommended due to the added stresses imposed on the strain gear at the crest of the wave.

It has been experimentally ascertained that a gear system can be easily made free from all backlash without a marked increase in input torque. This was checked on a gear made to the approximate dimensions of the gear described in connection with the calculation of the mechanical efficiency of the system by Formula 17 above, except that the number of lobes was three instead of two. An eight foot long boom was attached to the output shaft and backlash was measured at the end of this boom by a 0.001 inch dial indicator. No backlash was discernible under this test.

*Balanced forces.*—Since all of the forces necessary to produce torque are distributed at the pitch lines of both gears at a number of equal points equal to the number of lobes on the strain inducer, they tend to balance out and become equal. This effectively prevents any radial forces being inserted on the output shaft bearing as these tend to be self-centering. The same condition prevails on the input since the strain inducer also exerts its radial forces at a number of places equally spaced. All of the active forces within the strain wave gearing system are balanced so that they tend to produce only the desired result—the transmission of torque.

*No load on bearings.*—All of the forces within strain wave gearing are counterbalanced as discussed above in reference to balanced forces. Consequently a strain wave gearing system can be made to operate without bearings on either the input or the output. The forces all tend to be self-centering. Several models of strain wave gearing applied to motors have used this centering tendency as the motor bearing for one end of the armature. Therefore the bearings that are used on a strain wave gearing system are only to enclose the mechanism and withstand forces applied from the outside.

*Differential motion insensitive to eccentricity and tooth shape.*—A large change in tooth shape or contour produces the greatest effect on the percentage of teeth in contact. Even with such a shape, there are still many teeth in contact at several equally spaced points on the pitch circle. While this change has a deleterious effect on precise differential motion, the effect is small due to the size and number of teeth still in contact. As these teeth still have the tendency to center the input and output so as to make them coaxial, eccentricity of the gear pitch line with the bearing will tend to put a radial load on this bearing along the axis of the eccentricity. Unless this eccentricity is sufficiently large to interfere with tooth engagement, it should not affect the differential motion.

BASIC FORMS

In the preceding explanation of strain wave gearing, the strain wave gearing has been illustrated and described as an elliptical two lobe cam sliding directly on the strain gear. This simplified form facilitated explanation of the basic principles. However, there are many possible variations for the strain inducing element, each one having its own particular advantages.

The most ideal position is to have all points on the periphery of the expanded arbor just touch and fit inside the fully expanded ring 83. Under these conditions strain wave gearing has the greatest torque capabilities as an applied load cannot skew the strain wave. In practice, supporting it for 60° on each side of the crest on the wave is sufficient. Any suitable form of expanding arbor construction can be used, one example being shown in Figures 19 to 22 inclusive. In this form the shaft 82 has a square end 84 and beyond that has male threads 85. A washer 86 has a squared opening 87 which fits on the squared shaft portion 84, and is provided with a radial flange 88 and opposed wedge faces 90 outwardly directed and respectively engaging with cooperating wedge faces 91 on a square opening 92 formed in arbor segments 93 and 94 which are generally of circular exterior contour, becoming elliptical when the segments separate. The washer is adjusted to any desired position by interposing a shim 95 of the desired adjusted thickness between the arbor segments and the flange of the washer, and the washer flange is tightened to engage the arbor segments with the shoulders 96 on the end of the shaft by means of a nut 97 on thread 85. If it is desired to force the arbor segments out farther and modify the contour of the strain inducer, this can be accomplished by changing the shim thickness and tightening the nut 97. This construction is self-centering, and lends itself to varying degrees of wedge action to modify the strain inducer contour.

A strain wave gear made with a plain bearing strain inducer is of particular value in those cases where the gear train is to be self locking, as in a hoist or rotary table. It is particularly resistant to shock and rigid as it positively holds all of the teeth in an immovable position. However, it is only usable in slow moving properly lubricated applications due to its relatively low efficiency which is about 25 to 50% depending upon the coefficient of friction. Under ideal conditions with the coefficient of friction of 0.01, the efficiency would be about 60%.

Where self-centering is desired, it is important to use the three lobed strain inducer.

By using ball bearings on the strain inducer, the coefficient to friction can be materially reduced.

In the drawings referred to below, the ring gear is designated as 70 and the strain gear is designated as 71.

For moderate loads and larger diameter strain gears, the three lobe cam follower strain inducer shown in Figures 23 and 24 can be used. The shaft 82 mounts a planet mounting 101 thereon. The planet mounting has at equal circumferential positions as shown eccentric pins 102 each positioned at the same radial position, each on an axis parallel to the axis of shaft 82 and each carrying rotatable about the pins, but eccentric to their axes, standard ball-bearings 103 which act as cam followers. Thus by setting the positions of the eccentric pins and locking them in the proper positions, the radial action of the cam followers can be adjusted. It will be evident that all of the cam followers will be adjusted to the same radial position and will be equally circumferentially spaced. It will also be evident that since the cam followers are capable of adjustment as desired, they can be employed not only to apply the strain wave but also to spring preload the strain gear 71 for the purpose of eliminating backlash as already explained. The cam followers should be as large in diameter as possible to give the maximum obtainable support to the crest of the wave. This system does not have the same rigidity and does not have the same load carrying capability as the supported plain strain inducer or ball-bearing systems. Since the gear teeth that are carrying the load are not at the crest of the wave, a heavy load will tend to distort or skew the wave form when the strain gear is not supported at the side of the wave. This skewing will shift the load toward the teeth that are supported at the crest. For shock resistance this is an advantage as the strain gear has an increasing spring gradient to resist any load tending to distort it. While it is highly shock absorbent and resistant, it should not be operated under heavy load as this tends to produce additional stress in the strain gear 71.

Figures 25 and 26 show a form having a sun roller 104 on a separately driven sun shaft 105 which passes through an opening in a tubular shaft 82', the sun roller engaging the interiors of the followers 103 and the eccentric pins on which the followers are pivoted being left floating or rotatable and the followers constantly engaging the outside of the sun. The radial position of the followers is then determined by the size of the sun roller. This will operate much in the same manner as the form of Figures 23 and 24 except that it provides a vernier control for slow rotation of the roller carrier. If driven by the sun roller the over-all gear ratio is increased by the planetary reduction. This in effect gives you two speeds, the rotation of the sun being a relatively fine adjustment and the rotation of the main strain inducer shaft 82' being a coarse adjustment. If driven by the sun roller the over-all ratio is increased by the planetary reduction. To obtain the over-all ratio, the gear ratio of the strain wave gear is multiplied by $(r_1/r_2)+1$, which for practical purposes can be made to vary from about 2.5 to 10 depending on the diameter of the sun roller in relation to the diameter of the cam follower.

The three lobed strain inducer illustrated in Figures 27 and 28 drives by this planetary means and consequently the over-all gear ratio is from 2.5 to 10 times as great as the ratio of the strain wave gear in which it is used. In this form the inner race 97' is separated into two axially separate units 106 and 107, mounted on the shaft 82, and adjustable to increase or reduce the effective diameter of the external groove by inserting or removing shims at 108 between the race portions, and then clamping the race portions against the shims. Anti-friction bearing elements such as balls 98' move in the internal race and in the groove of a thin outer race 100. Adjustment of the deflection is accomplished as just explained by axial adjustment of the parts of the split inner race with respect to one another. This form is very simple and satisfactory for moderate loads. Its efficiency is probably the highest of any form as the rolling friction is reduced to a low level by the absence of a ball retainer and the small number of large diameter balls or other anti-friction elements involved. No retainer for the balls is required if the deflection has been adjusted so that there is a minimum of backlash.

Under these conditions the teeth in engagement on both sides of the wave crest tend to create 3 "valleys" 120° apart in which the balls roll. If this 120° relationship were made to vary, the load distribution among the balls becomes disproportionate. Under these conditions the change in ratio at the interface between the ball and the surfaces on which it rolls is altered by the localized tangential shear stress which rapidly restores the balls to the 120° spacing. This is the principle of operation of the mechanical torque converter and it has been experimentally demonstrated that it functions in this manner on strain wave gearing. Since the slope of the strain wave produces a very small angle to the circumference of the strain gear the ball is effectively prevented from slipping. It is essentially rolling into a definitely self-locking taper and consequently the radial displacement that it is causing can not produce slippage under load. However, it is limited in its load carrying capabilities for the same reasons outlined in the discussion of Figures 23 and 24.

Figures 29 and 30 illustrate a form which is in effect a reversal of the form of Figures 27 and 28. Whereas in Figures 27 and 28 the strain gear and the ring gear surround the race 100 and are external to the strain inducer, in Figures 29 and 30 the strain gear and the ring gear are positioned inside the race 100', and the strain gear is made adjustable by axially adjusting external adjustable race $97^2$, by changing shims 108 to bring race halves 106' and 107' closer together or farther apart under the action of bolt 110. The race $97^2$ engages the outside of balls 98' which are positioned at three points around the circumference to make a three lobe strain inducer. The race $97^2$ suitably has gear teeth 111 which are conveniently turned by gear 112.

If any of these strain inducers can be used in conjunction with and built into other equipment, the strain inducer can be used to replace one of the bearings necessary for such other equipment. For example, if it is built into an electric motor, the strain inducer can replace and become the bearing for one end of the armature.

In all of the illustrations of Figures 19 to 30 inclusive, the strain inducers have been shown with the preferred and most likely number of lobes. However, in each of these two or three lobes can be used as desired. A larger number of lobes can also be used but this in general is not recommended as there appear to be few special advantages to compensate for the corresponding complexity. Generally, two lobes are used except where self-centering is desired and in that case three lobes will ordinarily be employed. The forms of Figures 23 to 30 have three lobes to make them self centering. However, if bearings are independently employed to maintain the coaxial relationship of the input to the output, it would be entirely proper to use two lobes.

In the above examples of the strain inducers, the anti-friction elements have been shown generally as balls and ball-bearings. This has been done merely for convenience and is not intended to imply that ball-bearings will in every case be used nor even that ball bearings are the preferred form. Any one of the types of anti-friction bearing elements shown in my patent aforesaid may be used in the present invention.

In view of my invention and disclosure, variations and modifications to meet individual whim or particular need will doubtless become evident to other skilled in the art to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a device for transmitting motion, a first gear, a second gear of different diameter from the first having teeth of the same size as the first gear, concentric therewith and having a deflectable wall, strain-inducing means operative to deflect the second gear, and maintaining the second gear deflected into mating relation of its teeth with the teeth of the first gear at a plurality of circumferentially spaced positions interspaced by non-mating positions, the strain-inducing means comprising bearing elements circumferentially spaced and adapted to apply a strain wave to the second gear, means for varying the path in which the bearing elements travel, and means for moving the operative relationship of the strain-inducing means relative to the periphery of the second gear and thereby propagating a strain wave around the periphery of the second gear and causing relative rotation of the second gear with respect to the first gear.

2. A device of claim 1, in which the strain-inducing means also comprises an internal raceway for the bearing elements, and an external raceway for the bearing elements adapted to apply pressure to the inside of the second gear and in which the means for varying the path in which the bearing elements travel comprise means for varying the effective diameter of the internal raceway.

3. A device of claim 1, in which the strain-inducing means also comprises an external raceway for the bearing elements, and means for varying the path in which the bearing elements travel and comprising means for varying the contour of the external raceway.

4. In a device for transmitting motion, a first gear, a second gear of different diameter from the first gear, having teeth of the same size as the first gear, concentric therewith and having a deflected wall, strain-inducing means comprising cam means operative to deflect the second gear and maintain the second gear deflected into mating relation of its teeth with the teeth of the first gear at a plurality of circumferentially spaced positions interspaced on non-mating positions, means for adjusting the radial position of the cam means, and means for moving the operative relationship of the strain-inducing means including the cam means relative to the periphery of the second gear and thereby propagating a strain wave around the periphery of the second gear and causing relative rotation of the second gear with respect to the first gear.

5. A device of claim 4, in which the cam means are eccentrically mounted and are adjustable by angular change of position on their eccentric mounting.

6. In a device for transmitting motion, a first gear, a second gear of different diameter from the first gear having teeth of the same size as the first gear, concentric therewith and having a deflectable wall, strain-inducing means operative to deflect the second gear and maintaining the second gear deflected into mating relation of its teeth with the teeth of the first gear on the concentric axis at a plurality of circumferentially spaced positions interspaced by non-mating positions, the strain-inducing means including bearing elements at spaced circumferential positions, and means for varying the radial position of the bearing elements in the strain-inducing means, relative to the second gear for moving the operative relationship of the strain-inducing means relative to the periphery of the second gear and for rotating the bearing elements, and thereby propagating a strain wave around the periphery of the second gear and causing relative rotation of the second gear with respect to the first gear, the number of bearing elements which apply strain wave load equalling the number of spaced position of mating between the gears.

7. A device of claim 6, in which the strain-inducing means comprises a first raceway on which the bearing elements travel on the side opposed to that adjoining the second gear, and a second raceway on which the bearing elements travel on the side adjoining the second gear, and in which the means for deflecting the radial position of the second gear comprises means for varying the effective diameter of the first raceway.

8. In a device for transmitting motion, a first gear, a second gear of different diameter from the first gear having teeth of the same size of the first gear, and concentric therewith and having a deflectable wall, strain-inducing means operative to deflect the second gear and maintaining the second gear deflected into mating relation at its peak with the teeth of the first gear on the concentric axis at three generally equally circumferentially spaced mating positions interspaced by non-mating positions, and means for moving the operative relationship of the strain-inducing means relative to the periphery of the second gear, and thereby propagating a strain wave around the periphery of the second gear and causing relative rotation of the second gear with respect to the first gear.

9. In a device for transmitting motion, a first gear, a second gear of different diameter from the first gear having teeth of the same size as the first gear, concentric therewith and having a deflectable wall, strain-inducing means operative to deflect the second gear, and maintaining the second gear in deflected relation of its teeth with the teeth of the first gear on the concentric axis at a plurality of circumferentially spaced positions interspaced by non-mating positions, the strain-inducing means having three lobes, the tooth pressure angle being 20 degrees, and means for moving the operative relationship of the strain-inducing means relative to the periphery of the second gear and thereby propagating a strain wave around the periphery of the second gear, and causing relative rotation of the second gear with respect to the first gear.

10. In a device for transmitting motion, a first gear, a second gear of different diameter from the first gear having teeth of the same size at the teeth of the first gear, concentric therewith and having a deflectable wall, strain-inducing means operative to deflect the second gear and maintaining the second gear deflected into mating relation of its teeth with the teeth of the first gear at a plurality of circumferentially spaced positions interspaced by non-mating positions, the strain-inducing means comprising a rotatable cam mounting, a plurality of separate circumferentially spaced cams on the cam mounting, said cams engaging the second gear on the side remote from the first gear, and means for moving the operative relationship of said strain-inducing means relative to the periphery of the second gear, and thereby propagating a strain wave around the periphery of the second gear and causing relative motion of the second gear with respect to the first gear.

11. A device of claim 10, in combination with means for moving said separate circumferentially spaced cams radially inwardly and outwardly with respect to said cam mounting.

12. In a device for transmitting motion, a first gear, a second gear of different diameter from the first gear and having teeth of the same size as the first gear, concentric therewith and having a deflectable wall, strain-inducing means operative to deflect the second gear, and maintaining the second gear deflected into mating relation of its teeth with the teeth of the first gear on the concentric axis at a plurality of circumferentially spaced positions interspaced by non-mating positions, the strain inducing means comprising antifriction bearing elements of uniform diameter equally circumferentially spaced at three points around the circumference to make a three lobe strain inducing means, said bearing elements being located substantially adjacent the peaks of the lobes, and means for moving the operative relationship of the strain inducing means relative to the periphery of the second gear and thereby propagating a strain wave around the periphery of the second gear and causing relative rotation of the second gear with respect to the first gear.

13. In a device for transmitting motion, a first tooth member, a second tooth member of different diameter from the first having teeth which cooperate with the teeth of the first tooth member, the second tooth member and the first tooth member being one surrounding the other and concentric, and the second tooth member having a deflectable wall, strain-inducing means operative to deflect the second tooth member, and maintaining the second tooth member deflected into mating relation of its teeth with the teeth of the first tooth member at a plurality of circumferentially spaced positions interspaced by non-mating positions, the strain inducing means comprising bearing elements circumferentially spaced and adapted to apply a strain wave to the second tooth member, means for varying the path in which the bearing elements travel, and means for moving the operative relationship of the strain-inducing means relative to the periphery of the second tooth member and thereby propagating a strain wave around the periphery of the second tooth member and causing relative motion of the second tooth member with respect to the first tooth member.

No references cited.